United States Patent Office 2,731,448
Patented Jan. 17, 1956

2,731,448

COPOLYMERS OF ALLYL ESTERS AND ITACONATES

La Verne N. Bauer, Philadelphia, Harry T. Neher, Bristol, and William L. Van Horne, Cheltenham, Pa., assignors to Rohm & Haas Company, Philadelphia, Pa., a corporation of Delaware No Drawing. Application April 29, 1952,
Serial No. 285,082

3 Claims. (Cl. 260—78.5)

This invention concerns copolymers of (A) allyl stearate, margarate, or palmitate and (B) didodecyl itaconate in which the ratio of groups from B to groups from A is from 0.5/1 to 5/1. These copolymers are effective pour point depressants for wax-containing lubricating oils and similar fluids. This invention also deals with compositions comprising a hydrocarbon fluid having a waxy pour point which has dissolved therein a said copolymer in an amount sufficient to lower significantly the pour point thereof.

While addition of resinous materials to oils has been proposed for various purposes, it is not common that these materials depress the pour point of the resulting solution. The common effect of polymeric materials dissolved in oils is to increase the viscosity. Some materials improve the temperature-viscosity relations of the oil. The pour point is frequently raised. Many times it remains unchanged. Occasionally it is lowered. But it cannot be accurately foretold when this result will be obtained.

Polymers of allyl stearate, allyl margarate, or allyl palmitate are oil soluble, but they do not depress the pour point of wax-containing oils. Similarly polymers of didodecyl itaconate, decyl itaconate, and dioctyl itaconate can be dissolved in various kinds of hydrocarbon fluids which have waxy pour points. They fail, however, to lower the pour points of these oils. Mixtures of the several types of polymers are likewise ineffective in depressing pour points of wax-containing oils. Yet copolymers from these same two types of esters are highly effective pour point depressants when the two types are used in proper proportions in forming the copolymer.

The allyl esters have the formula

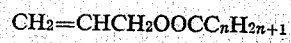

where $n$ has a value from 15 to 17, the carbon atoms occurring in a chain. These acid residues are from saturated unsubstituted aliphatic monocarboxylic acids of 16 to 18 carbon atoms. It is essential to have the defined proportion of these long-chained residues in the copolymers to provide pour point depressing activity. The allyl portion of the molecule can in many copolymers be replaced with the equivalent methallyl group or the chloroallyl group.

Methods are known for preparing the individual monomers required for forming copolymers of this invention. Itaconates may be prepared by esterification of itaconic acid or through alcoholysis or transesterification of a lower dialkyl itaconate. Allyl esters may be prepared by comparable methods.

Didodecyl itaconate may be prepared from pure dodecyl alcohol or from commercial products which contain a range of other saturated aliphatic monohydric alcohols. For a comparable result some octyl, decyl, or even myristyl groups may be used in forming the itaconates. It is best, however, to have as the major portion of the alkyl groups the twelve carbon chain of the $n$-dodecyl group.

The copolymers are formed by mixing allyl stearate, margarate, or palmitate and didodecyl itaconate in a proportion of one mole of the allyl ester to 0.5 to 5 moles of the itaconate. A polymerization catalyst is added to the mixture and copolymerization is effected, usually by heating the mixture best in an inert atmosphere. Copolymerization may best be effected in an inert organic solvent, such as benzene, toluene, xylene, naphtha, or an oil.

As catalysts for effecting copolymerization there are used acyclic azo compounds, such as azodiisobutyronitrile or dimethyl azodiisobutyrate, or organic peroxides or other active free radical catalyst. Typical peroxide catalysts are acetyl peroxide, caproyl peroxide, lauroyl peroxide, benzoyl peroxide, dibutyl diperphthalate, tert.-butyl perbenzoate, methyl ethyl ketone peroxide, di-tert.-butyl peroxide, tert.-butyl hydroperoxide, and so on.

Amounts of catalyst used may vary from about 1% to 15% of the weight of the mixed monomers. In a preferred method a small amount of catalyst is used at the start and catalyst is added from time to time as copolymerization proceeds. Solvent may likewise be added as copolymerization progresses. Copolymerization is usually accomplished at temperatures between 60° and 150° C. Best temperatures for copolymerization will depend on the mixture of monomers, the solvent, concentration of monomers and of catalyst, copolymerization schedule, size of copolymer desired, and similar considerations, which are now understood in the art.

Typical preparations of copolymers are detailed in the following illustrative examples.

Example 1

A reaction vessel equipped with stirrer, reflux condenser, inlet tube for an inert gas, thermometer, and oil bath was charged over a period of 1.8 hours with a mixture of 25.8 parts of allyl stearate, 74.2 parts of dilauryl itaconate, and 5 parts of benzoyl peroxide. Nitrogen gas was passed through the inlet tube before the addition of the charge was started, during the addition, and slowly thereafter. The temperature of the batch at the start was 115°–120° C. and this level was held for the first four hours. It was then reduced and maintained at 105°–100° C. until the end of 7.5 hours. Additions of benzoyl peroxide and of toluene were made as follows: at 2.8 hours, 2 parts of peroxide and 30 parts of toluene; at 4.1 hours, 5 parts of peroxide; at 5.5 hours, 2 parts of peroxide; at 6.5 hours, 0.8 part of peroxide; at 7.1 hours, 150 parts of toluene. The product was a clear, viscous solution containing 36.6% of copolymer, a yield of 95.2%. The viscosity of a toluene solution adjusted to 30% of the copolymer was 6.3 centistokes at 100° F.

This copolymer was transferred to a light neutral oil by mixing the above product and the oil and taking off the solvent by heating the mixture under reduced pressure to 140° C./1 mm. The oil solution thus prepared contained 37% of copolymer. This solution was useful for supplying the copolymer to wax-containing oils.

A blend of this oil solution and a conventionally refined Pennsylvania 150 neutral oil having a normal pour point of +25° F. was prepared to supply 0.5% of the copolymer. This blend had a pour point of −40° F.

Example 2

In the same way there were mixed 58.2 parts of allyl stearate, 41.8 parts of di-n-dodecyl itaconate, and 5 parts of benzoyl peroxide. Copolymerization was started under an inert gas at 120° C. and later the temperature was reduced and held at 100° C. From time to time catalyst was added to a total of 14.8 parts and toluene was added to a total of 160 parts. Heating was discontinued at 7.75 hours. A 35.7% solution of copolymer in toluene was obtained, a 95% yield. A 30% solution of copolymer in toluene had a viscosity of 5.9 centistokes at 100° F.

A 0.5% solution of this copolymer in an oil having a normal pour point of +25° F. had a pour point of −15° F.

Example 3

In the same way 35 parts of allyl stearate and 65 parts of di-n-dodecyl itaconate were copolymerized with use of a total of 15 parts of benzoyl peroxide and 149 parts of toluene. Temperatures at the early stage of copolymerization were 110° to 115° C. and the temperature was then allowed to fall to 103° C. The product was a 37.8% solution of copolymer, which gave a viscosity at 100° F. of 5.4 centistokes to a 30% solution thereof in toluene.

At 0.5% in an oil having a normal pour point of +25° F. this copolymer reduced the pour point to −30° F.

Example 4

In the same way 10.4 parts of allyl stearate and 89.6 parts of dilauryl itaconate (a 1:6 mole ratio) were copolymerized, starting at 115° C. and later continuing at 100°–105° C. The lauryl group here was obtained from a commercial lauryl alcohol. The resulting copolymer at 0.5% in an oil having a normal pour point of +25° F. reduced the pour point to only +5° F. A somewhat similar copolymer was prepared in a 1:12 mole ratio. It failed to lower the pour point of the test oils. From these and other tests it became evident that mole ratios of 1:0.5 to 1:5 of allyl ester having a chain in the saturated aliphatic carboxylic portion of 16 to 18 carbon atoms and didodecyl itaconate are necessary to ensure a commercially practical lowering of the pour point. Tests with copolymers from allyl stearate and dihexyl itaconate failed to reveal a copolymer having true pour point depressing action. With some copolymers based on dioctyl itaconate some depressing action could be obtained, but the worthwhile copolymers are those based principally on di-n-dodecyl itaconate to supply the itaconate portion thereof, the presence of closely homologous groups, however, not interfering with the marked effectiveness of dodecyl groups in the proportions here indicated.

Example 5

In the same way there were mixed 39.6 parts of allyl palmitate and 60.4 parts of di-n-dodecyl itaconate and this mixture was copolymerized at temperatures from 115° to 100° C. with the aid of 14 parts of benzoyl peroxide added in small increments from time to time and of 140 parts of toluene. Time of copolymerization was eight hours.

This copolymer at 0.5% in an oil having a normal pour point of +25° F. depressed the pour point to −30° F.

Example 6

In the same way 11.6 parts of allyl palmitate was copolymerized with 88.4 parts of dilauryl itaconate. The resulting copolymer at 0.5% in an oil having a normal pour point of +25° F. depressed the pour point to −15° F.

Tests of copolymers of this invention were made over a range of concentrations in a Pennsylvania 150 neutral oil having a pour point of +25° F. and a viscosity index of 106.9. The standard A. S. T. M. pour test method (D97–47) was used.

A copolymer from one mole of allyl stearate and 0.5 mole of didodecyl itaconate reduced the pour point of this test oil to −15° F. at 0.5%, 0.25%, and 0.1%, and to −10° F. at 0.04%. In a 90 S. A. E. gear oil at 0.1% it depressed the pour point from +25° F. to +5° F.

A copolymer from one mole of allyl stearate and 1.5 moles of didodecyl itaconate reduced the pour point of the test oil as follows: at 0.5% to −30° F., at 0.25% to −25° F., at 0.1% to −20° F., and at 0.04% to −15° F. In the 90 S. A. E. gear oil at 0.1% it reduced the pour point to −5° F.

A polymer of allyl stearate was dissolved in the test oil at 0.5%. The pour point was +30° F. At 0.25% the pour point was +25° F. A polymer of di-n-dodecyl itaconate was likewise dissolved in the test oil at 0.5% and 0.25%. The pour points were +30° to +25° F. One part of polyallyl stearate was mixed with two parts of the polymer of didodecyl itaconate. A 0.5% solution of the mixed polymers in the test oil has a pour point of +30° F.

A copolymer from one mole of allyl stearate and two moles of didodecyl itaconate reduced the pour point of the test oil to −40° F. at 0.5% and 0.25%, to −30° F. at 0.1%, and to −15° F. at 0.04%.

A copolymer from one mole of allyl stearate and four moles of didodecyl itaconate gave pour points for the test oil of −25° F. at 0.5% to 0.1% and −15° F. at 0.04%.

The copolymers of this invention are readily formed and are peculiarly effective as pour point depressants for wax-containing oils. They may be prepared in a wide range of molecular sizes. But the influence of the copolymers on pour point does not seem to be related to molecular size. Apparent molecular weights can vary from about a thousand to values of the order of 30,000 or more. Copolymers of large molecular size act not only as pour point depressants but also as V. I. improvers. For example, a copolymer from 25.8 parts of allyl stearate and 74.2 parts of didodecyl itaconate (a 1:2 mole ratio) was dissolved in a Pennsylvania oil having a V. I. of 106.9. A 2% solution of this copolymer had viscosities of 6.21 centistokes at 210° F. and 38.12 centistokes at 100° F., giving a V. I. of 120.

A useful range of concentrations of the copolymers of this invention in wax-containing oils is between 0.01% and 5%, the amount used being sufficient to lower the pour point of the oil.

We claim:

1. A copolymer of (A) an allyl ester of a saturated unsubstituted aliphatic monocarboxylic acid of 16 to 18 carbon atoms in a straight chain and (B) didodecyl itaconate, the ratio of units from allyl ester to units from the itaconate being from about 1:0.5 to about 1:5.

2. A copolymer of allyl stearate and didodecyl itaconate, the ratio of units from allyl stearate to units from the itaconate being from about 1:0.5 to about 1:5.

3. A copolymer of allyl palmitate and didodecyl itaconate, the ratio of units from allyl palmitate to units from the itaconate being from about 1:0.5 to about 1:5.

References Cited in the file of this patent

UNITED STATES PATENTS

| 2,543,964 | Giammaria | Mar. 6, 1951 |
| 2,557,189 | Irany et al. | June 19, 1951 |
| 2,600,447 | Van Horne et al. | June 17, 1952 |